United States Patent
Lange et al.

(10) Patent No.: US 7,398,691 B2
(45) Date of Patent: Jul. 15, 2008

(54) PRESSURE PICKUP WITH FLAME PENETRATION BARRIER

(75) Inventors: Jürgen Lange, Vellmar (DE); Raimund Becher, Ehrenkirchen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/551,221

(22) PCT Filed: Mar. 31, 2004

(86) PCT No.: PCT/EP2004/003407
§ 371 (c)(1),
(2), (4) Date: Sep. 11, 2006

(87) PCT Pub. No.: WO2004/088267
PCT Pub. Date: Oct. 14, 2004

(65) Prior Publication Data
US 2007/0151352 A1 Jul. 5, 2007

(30) Foreign Application Priority Data
Apr. 1, 2003 (DE) .............................. 103 14 920

(51) Int. Cl.
*G01L 15/00* (2006.01)

(52) U.S. Cl. ......................................................... 73/706
(58) Field of Classification Search ..................... 73/706
See application file for complete search history.

(56) References Cited

U.S. PATENT DOCUMENTS

| | | | |
|---|---|---|---|
| 4,733,563 A * | 3/1988 | Nava et al. ..................... 73/706 |
| 5,583,294 A * | 12/1996 | Karas ........................... 73/706 |
| 6,038,927 A * | 3/2000 | Karas ........................... 73/706 |
| 6,279,401 B1 * | 8/2001 | Karas ........................... 73/716 |

* cited by examiner

*Primary Examiner*—Andre J. Allen
(74) *Attorney, Agent, or Firm*—Bacon & thomas, PLLC

(57) ABSTRACT

A pressure pickup includes a pressure measuring cell and a platform through which a pressure canal equipped with a flame penetration barrier extends. The pressure measuring cell is loadable with the process pressure through the pressure canal by means of a transmitting medium. The pressure canal includes a first section and a second section, with the flame penetration barrier being arranged in a first section, and a second section has a bore, in which a fill-body is arranged. The gap between the bore and the fill-body is manufactured with greater tolerances, so that it does not fulfill the requirements for a flame penetration barrier. The flame penetration barrier is realized in the first section, for example, by providing in the first section a bore, in which a fill-pin is arranged, with the remaining gap between the bore and the fill-pin satisfying the requirements for a flame penetration barrier.

10 Claims, 1 Drawing Sheet

PRESSURE PICKUP WITH FLAME PENETRATION BARRIER

FIELD OF THE INVENTION

The present invention relates to pressure, and pressure-difference, measuring devices having a hydraulic measuring mechanism, or a hydraulic separator, as the case may be. In the case of these measuring devices, a separating membrane, or diaphragm, transfers the pressure to a hydraulic medium, which transmits the pressure via a suitable pressure canal to a pressure measuring cell, which has a pressure sensitive element, especially a measuring membrane, which is loaded with the pressure. The pressure canal extends frequently in the form of a bore through a process connection fitting, by which the pressure pickup is connected to a line under pressure.

BACKGROUND OF THE INVENTION

For devices in explosion-endangered applications, it is necessary that the pressure canal have, as a function of its length, a sufficiently small diameter, or a sufficiently small gap width, in order to serve as a flame penetration barrier. Since it is very difficult to drill sufficiently long canals with diameter of less than, for example, 0.1 mm, the practice has arisen of providing larger diameter bores and subsequently inserting a fill-pin into the bore, such that a sufficiently narrow gap remains between the fill-pin and the wall of the bore. This solution is, however, disadvantageous insofar as even the bore of larger diameter must be made with the necessary precision, in order that, following insertion of the fill-pin, the allowable maximum gap size is not exceeded. The longer the process connection fitting, the greater is then the complexity of providing the bore for the pressure canal.

SUMMARY OF THE INVENTION

An object of the present invention is, therefore, to provide a pressure pickup, which overcomes the described problems. The object is achieved, according to the invention, by the pressure pickup having a pressure measuring cell and a platform having a first surface and a second surface, wherein through the platform, between the first surface and the second surface a pressure canal extends through which the pressure measuring cell is loadable with the process pressure by means of a transmitting medium, wherein the pressure canal has a flame penetration barrier. The pressure canal includes a first section in which the flame penetration barrier is arranged, and a second section which has a bore in which a fill-body is arranged, wherein the second section does not satisfy the requirements for a flame penetration barrier.

The pressure pickup of the invention for the registering of a pressure includes a pressure measuring cell and a platform having a first surface and a second surface. Extending through the platform, between the first surface and the second surface is a pressure canal, through which the pressure measuring cell can be loaded, by means of a transmitting medium, with the process pressure, with the pressure canal exhibiting a flame penetration barrier, with, additionally, the pressure canal including a first section and a second section, the flame penetration barrier being arranged completely in the first section, and the second section including a bore, in which a fill-body is arranged. The gap between the bore and the fill body in the second section can be manufactured with greater tolerances, so that it does not fulfill the requirements for a flame penetration barrier.

Preferably, the flame penetration barrier in the first section is realized by the features that the first section has a bore, in which a fill-pin is arranged, with the remaining gap between the bore and the fill-pin satisfying the requirements for a flame penetration barrier. The fill pin can be inserted into the first section independently of the fill-body, as a separate part, or it can be embodied such that it and the fill-body are formed as one piece. Insofar as the fill-pin is formed as one piece with the fill-body, the fill-pin preferably has a smaller diameter than the fill-body.

In another embodiment, the flame penetration barrier can be realized by the features that the first section has a bore, whose diameter for the given length satisfies the requirements for a flame penetration barrier.

The invention can equally be applied in the case of pressure-difference pickups, which have at least one pressure canal, but preferably two pressure canals, of the described kind, with the first pressure canal bringing a first pressure to the measuring cell and the second pressure canal bringing a second pressure to the measuring cell.

BRIEF DESCRIPTION OF THE DRAWINGS

Further advantages and aspects of the invention follow from the dependent claims, the description of the examples of embodiments, and the drawings, the figures of which show as follows:

DESCRIPTION OF THE PREFERRED EMBODIMENTS

Figure 1:
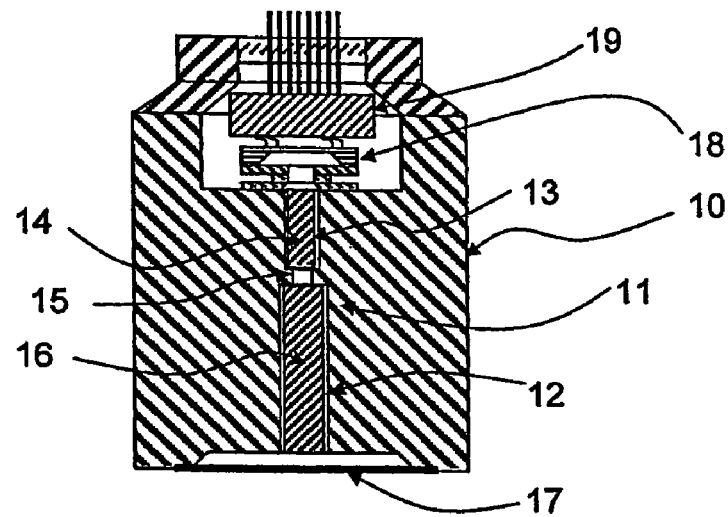
FIG. 1 a section through a first example of an embodiment of a pressure pickup of the invention.

The pressure pickup 1 shown in FIG. 1 includes a platform 10 with preferably sectionally cylindrical or frustoconical geometry. A separating membrane 17 is secured pressure-tightly at its edge region on the process-facing end surface of the platform 10, such that a pressure chamber is enclosed between the membrane and the platform. The pressure chamber involves, preferably, a recess in the end surface. The base surface of the recess can be a contoured membrane bed, whose contours are complementary to those of the separating membrane 17. Extending to a sensor chamber from the pressure chamber is a pressure canal 11. The sensor chamber is formed in a cavity on the second, process-far, end surface of the platform 10. A pressure measuring cell 18 is arranged in the sensor chamber, with the pressure canal 11 opening into a region of the sensor chamber sealed by the pressure measuring cell 18. At this time, piezoresistive silicon pressure measuring cells are preferred, but any other pressure measuring cells are equally suitable, especially capacitive pressure measuring cells and those based on the resonator principle. The volume enclosed between the pressure measuring cell 18 and the separating membrane 17, including the free volume of the pressure canal 11, i.e. the volume which is not filled by a fill-pin and/or fill-body, is filled with a hydraulic transmitting liquid, with silicone oils being preferred as hydraulic transmitting liquid at this time. When, during measuring operation, a process pressure acts on the outer surface of the separating membrane 17, such pressure is transmitted, because of the flexibility of the separating membrane 17, into the pressure chamber, and, from there, via the transmitting liquid, to the measuring cell.

The pressure canal 11 has a flame penetration barrier in a first section 13. The flame penetration barrier is realized by providing the first section 13 with a bore, which has been manufactured with very small tolerances as regards its diameter, and by inserting into such bore a cylindrical fill-pin 14 whose lateral surface likewise exhibits very small tolerances, so that the remaining annular gap between the wall of the bore and the lateral surface satisfies the requirements for a flame penetration barrier. For the centering of the fill-pin, such can have in its end sections radial protrusions, which, as required, can also serve to provide the fill-pin with a, centered, frictional fit in the bore of the first section 13. In order to hold the fill-pin in position by means of a frictional fit, the fill-pin can also be slightly arced, so that it presses with its end sections and a central section against the wall of the first section 13.

A frictional seating can also be achieved by an upsetting at the end face of the platform. To this end, in the vicinity of the opening of the pressure canal, for example with a punch, a localized plastic deformation is introduced into the end face, such that the end section of the pressure canal is narrowed sufficiently that the fill-pin is clamped in position.

For controlling the axial position of the fill-pin, a narrowing 15 at the process-near end of the first section can be provided, which represents an axial abutment surface for the fill-pin 14.

Exact dimensions for the bore in the first section 13 and the fill-pin 14 result from the requirements for a flame penetration barrier and are to be reflected in the details of a particular design. Example of dimensions are presented in the following Table I:

TABLE I

| Effective length [mm] | Allowed gap width [mm] | Bore- and fill-pin-length [mm] | Bore diameter [mm] | Fill-pin diameter [mm] |
|---|---|---|---|---|
| ≧6 | 0.05 | 6 | 2.700 ± 0.005 | 2.660 ± 0.005 |
| ≧12.5 | 0.08 | 12.5 | 3.000 ± 0.012 | 2.945 ± 0.012 |
| ≧40 | 0.10 | 40 | 3.000 ± 0.017 | 2.935 ± 0.017 |

Manufacture of the surfaces for the flame penetration barrier requires considerable effort, so that the size of these surfaces (i.e. the lengths of the bores and fill-pins) is preferably reduced to a minimum.

The remaining length of the pressure canal 11 extends in a second section 12 between the narrowing 15 and the process-near pressure chamber. In order to reduce the fill-volume of the transmitting medium, a fill-body 16 is arranged in the second section 12. The bore of the second section 12, as well as the lateral surface of the fill-body 16, do not need to be manufactured with the precision of the analogous surfaces of the flame penetration barrier. Important is only that a gap remain between the bore and the fill-body 16, through which the transmitting liquid can transmit the pressure from the pressure chamber to the sensor element 18. For this, greater tolerances are allowable. By separating the function of volume reduction from the function of flame penetration barrier, the manufacturing effort can, therefore, be significantly reduced.

The axial position of the fill-body 16 is defined by the process-near abutment surface of the narrowing 15. Additionally, either radial protrusions can fix the fill-body 16 in the bore of the second section, or the fill-body can be secured via a frictional seating by a slight bending, or an upsetting.

Figure 2:
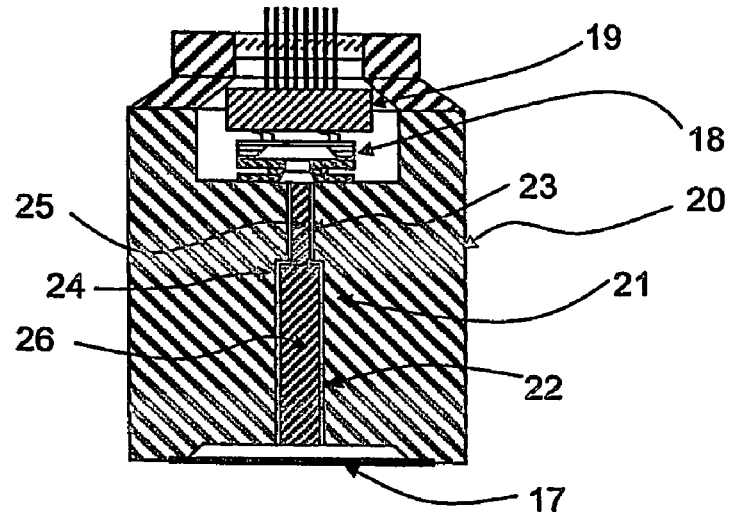
FIG. 2 a section through a second example of an embodiment of a pressure pickup of the invention.
Figure 3:
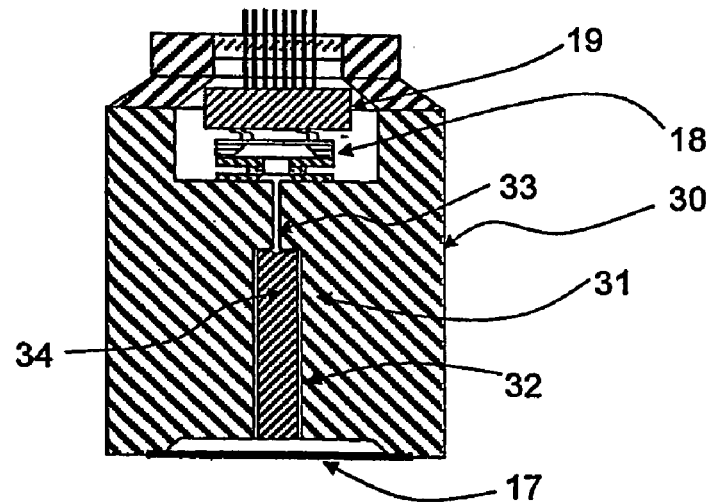
FIG. 3 a section through a third example of an embodiment of a pressure pickup of the invention.

The examples of embodiments 2 and 3 shown, respectively, in FIGS. 2 and 3 of a pressure pickup have essentially the structure of the above-described pressure pickup 1 of FIG. 1, and equal reference characters refer to parts and components having equal functions. Therefore, in the following, only the differences relative to the pressure pickup of FIG. 1 will be discussed.

The pressure pickup shown in FIG. 2 has in its platform 20 a pressure canal 21 formed differently from the pressure canal 10 of the first example of an embodiment. Pressure canal 21 includes a first section 23 and a second section 22, with the first section following directly on the second section, without being separated by a narrowing. The first section 23 has a lesser diameter than the second section 22. Consequently, at the transition between the first section and the second section, a first axial shoulder is formed. Inserted into the pressure canal 21 is a single-piece fill-module 24, which has in a first section a fill-pin 25 and in a second section a fill-body 26, with the fill-body preferably bordering directly on the fill-pin, so that, between the fill-pin and the fill-body, a second axial shoulder is formed. The diameter of the fill-pin 25 is so matched to the dimensions of the first section 23 of the pressure canal 21, that the first section 23 with inserted fill-pin fulfills the requirements for a flame penetration barrier. The fill-body 26 is so dimensioned, that the free volume enclosed in the pressure canal 21 and filled with a transmitting liquid is minimized.

The axial position of the one-piece fill-module 24 in the pressure canal 21 is defined by the lying of the second axial abutment surface against the first axial abutment surface. For the axial fixing of the fill-module 24, again a frictional seating is available.

In the case of the form of embodiment of the pressure pickup in FIG. 3, the platform 30 has a pressure canal 31 with a first section 33, which fulfills the requirements for a flame penetration barrier without the use of a fill-pin. On the process-near end, there follows on the first section 33 of the pressure canal 31 a second section 32, which has a significantly greater diameter than the first section. In the second section 32, a fill-body 34 is arranged, which minimizes the free volume of the second section 32 of the pressure canal 31. The axial position of the fill-body 34 is defined by an axial stop, which is formed between the first section 33 and the second section 32. The axial fixing of the fill-body occurs, as described above, by a frictional seating.

The invention claimed is:

1. A pressure pickup for the registering of a process pressure, comprising:
   a pressure measuring cell; and
   a platform having a first surface and a second surface, wherein:
   through said platform, between said first surface and said second surface, a pressure canal extends, through which said pressure measuring cell is loadable with the process pressure by means of a transmitting medium;
   said pressure canal having a flame penetration barrier
   said pressure canal includes a first section and a second section, with said flame penetration barrier is arranged in said first section; and
   said second section has a bore, in which a fill-body is arranged, said second section does not satisfy the requirements for a flame penetration barrier.

2. A pressure pickup for the registering of a pressure difference between a first process pressure and a second process pressure, comprising:
   a pressure-difference measuring cell;

a platform, through which two pressure canals extend, via which said pressure-difference measuring cell is loadable with the first and second process pressures, wherein:

at least one of said two pressure canals has a flame penetration barrier, at least one of said two pressure canals includes a first section and a second section, with said flame penetration barrier is arranged in said first section, and said second section has a bore, in which a fill-body is arranged; and said second section does not satisfy the requirements for a flame penetration barrier.

3. The pressure pickup as claimed in claim 1, further comprising:

a fill-pin, wherein:

said first section has a bore, in which said fill-pin is arranged; and the remaining gap between the bore and the fill-pin satisfies the requirements for a flame penetration barrier.

4. The pressure pickup as claimed in claim 3, wherein:
said fill-pin is inserted into said first section as a separate part independently of said fill-body.

5. The pressure pickup as claimed in claim 3, wherein:
said fill-pin is formed as one piece with said fill-body.

6. The pressure pickup as claimed in claim 4, wherein:
said fill-pin has a lesser diameter than said fill-body.

7. The pressure pickup as claimed in claim 1, wherein:
said first section of said pressure canal is manufactured with smaller tolerances than said second section of said pressure canal.

8. The pressure pickup as claimed in claim 3, wherein:
said fill-pin is manufactured with smaller tolerances than said fill-body.

9. The pressure pickup as claimed in claim 1, wherein:
said first section has a bore, whose diameter at a given length satisfies the requirements for a flame penetration barrier.

10. The pressure pickup as claimed in claim 3, wherein:
each of the pressure canals has a flame penetration barrier as well as a first section and a second section;

and each flame penetration barrier is arranged in said first section, and each second section has a bore, in which a fill-body is arranged.

* * * * *